United States Patent
Tsai (10) Patent No.: US 9,077,941 B2
(45) Date of Patent: Jul. 7, 2015

(54) IMAGE PROCESSING METHOD AND IMAGE PROCESSING DEVICE

(71) Applicant: Himax Imaging Limited, Tainan (TW)

(72) Inventor: Yi-Lin Tsai, Tainan (TW)

(73) Assignee: HIMAX IMAGING LIMITED, Tainan (TW)

( * ) Notice: Subject to any disclaimer, the term of this patent is extended or adjusted under 35 U.S.C. 154(b) by 70 days.

(21) Appl. No.: 14/016,378

(22) Filed: Sep. 3, 2013

(65) Prior Publication Data

US 2015/0062388 A1 Mar. 5, 2015

(51) Int. Cl.
*G06K 9/00* (2006.01)
*H04N 9/64* (2006.01)
*H04N 5/367* (2011.01)
*H04N 9/77* (2006.01)

(52) U.S. Cl.
CPC .............. *H04N 9/646* (2013.01); *H04N 5/367* (2013.01); *H04N 9/77* (2013.01)

(58) Field of Classification Search
None
See application file for complete search history.

(56) References Cited

U.S. PATENT DOCUMENTS

| 7,173,741 B1 * | 2/2007 | Kindt et al. ............... 358/443 |
| 2003/0169346 A1 * | 9/2003 | Ojima et al. ............ 348/207.99 |
| 2006/0238629 A1 * | 10/2006 | Sato et al. ................ 348/241 |
| 2010/0061625 A1 * | 3/2010 | Lukac ....................... 382/162 |
| 2012/0154645 A1 * | 6/2012 | Ohbuchi et al. ........... 348/246 |
| 2013/0077858 A1 * | 3/2013 | Peng et al. ................ 382/162 |
| 2014/0307130 A1 * | 10/2014 | Furuta et al. ............. 348/246 |

* cited by examiner

*Primary Examiner* — Nirav G Patel
*Assistant Examiner* — Ian Lemieux
(74) *Attorney, Agent, or Firm* — McClure, Qualey & Rodack, LLP (57) ABSTRACT

A bad pixel correction method for an image is provided. The bad pixel correction method includes the steps of determining whether each of pixels of a predetermined block in the image is a bad pixel sequentially; when a current pixel of the block is determined to be bad and a temperature value is higher than a threshold, re-determining that at least one previously determined pixel in the predetermined block to be bad; and correcting the current pixel and the previously determined pixel, wherein the previously determined pixel is adjacent to the current pixel.

14 Claims, 6 Drawing Sheets

IMAGE PROCESSING METHOD AND IMAGE PROCESSING DEVICE

BACKGROUND OF THE INVENTION

1. Field of the Invention

The present disclosure relates to an image processing method and an image processing device.

2. Description of the Related Art

A color filter array (CFA) in a Complementary Metal-Oxide-Semiconductor (CMOS) image sensor is usually arranged in a Bayer pattern. Raw data from a sensor is processed by de-mosaic processing (color interpolation) to produce an image, wherein each pixel of the image includes red, green and blue components. For example, a Bayer pattern is formed by one red pixel, one blue pixel and two green pixels arranged in a 2*2 pixel array. One of the significant factors impacting the yield of CMOS image sensors is bad pixels; especially, in high temperature environments, wherein bad pixels and noise worsens.

Therefore, a bad pixel correction unit to correct bad pixels in an image processing device is called for.

BRIEF SUMMARY OF INVENTION

A detailed description is given in the following embodiments with reference to the accompanying drawings.

In one embodiment, the invention provides a bad pixel correction method for an image. The bad pixel correction method comprises the steps of determining whether each of pixels of a predetermined block in the image is a bad pixel sequentially; when a current pixel of the block is determined to be bad and a temperature value is higher than a threshold, re-determining that at least one previously determined pixel in the predetermined block to be bad; and correcting the current pixel and the previously determined pixel, wherein the previously determined pixel is adjacent to the current pixel.

In one embodiment, the invention provides an image processing device. The image processing device comprises a bad pixel correction unit. The bad pixel correction unit is arranged to determine whether each of pixels of a predetermined block in the image is a bad pixel sequentially, re-determine that at least one previously determined pixel in the predetermined block to be bad, when a current pixel of the block is determined to be bad and a temperature value is higher than a threshold, and correct the current pixel and the previously determined pixel, wherein the previously determined pixel is adjacent to the current pixel.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
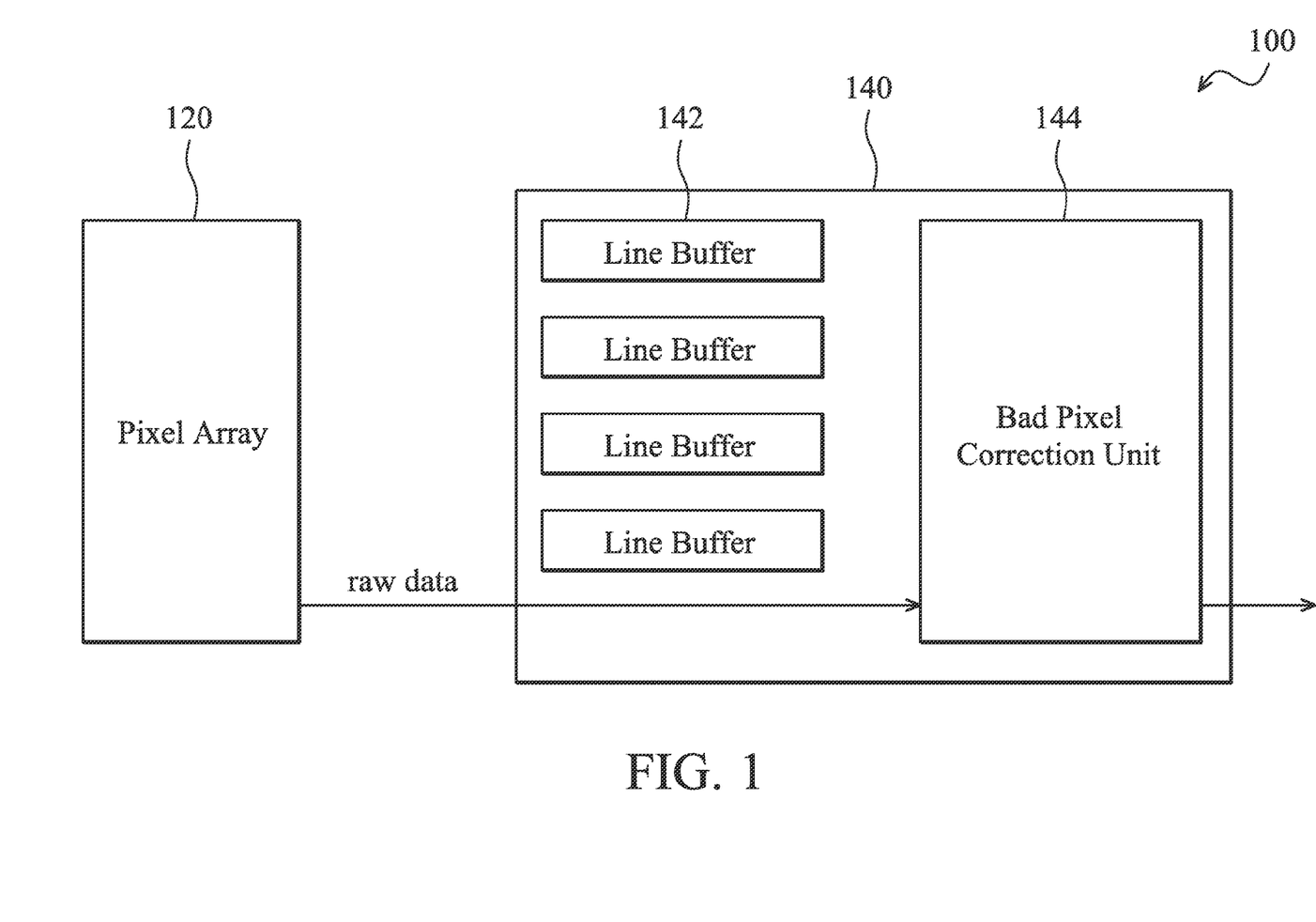
FIG. 1 is a diagram showing an exemplary image sensor.
Figure 2:
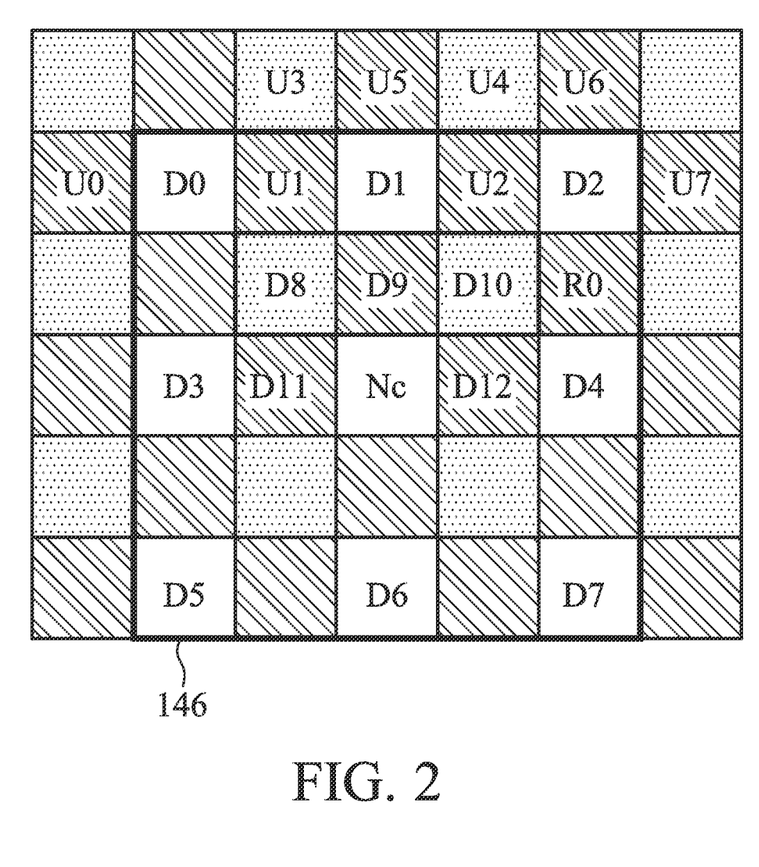
FIG. 2 is a diagram showing an exemplary pixel array arranged in Bayer pattern.

FIG. 1 is a diagram showing an exemplary image sensor. The image sensor 100 includes a pixel array 120 and an image processor 140. The image processor 140 includes plural line buffers 142 and a bad pixel correction unit 144. The number of the line buffers 142 of the image processor 140 for storing raw data can be as few as possible, such as four in this embodiment to store four lines of a raw image from the pixel array 120. With the four line buffers and one current line, the bad pixel correction unit 144 can process 5*5 array data one by one. FIG. 2 is a diagram showing an exemplary pixel array arranged in Bayer pattern. Current pixel Nc is the center pixel of the 5*5 array (i.e., a predetermined block 146 of the raw image) processed by the bad pixel correction unit 144. If the pixel Nc is a bad pixel, the other surrounding pixels are likely affected and may become bad pixels, for example, due to the increasing temperature. In one example, in the beginning, the surrounding pixels D9, D11 and D12 etc. in the cross direction around the pixel Nc will become bad pixels due to the increasing temperature.

Figure 3:
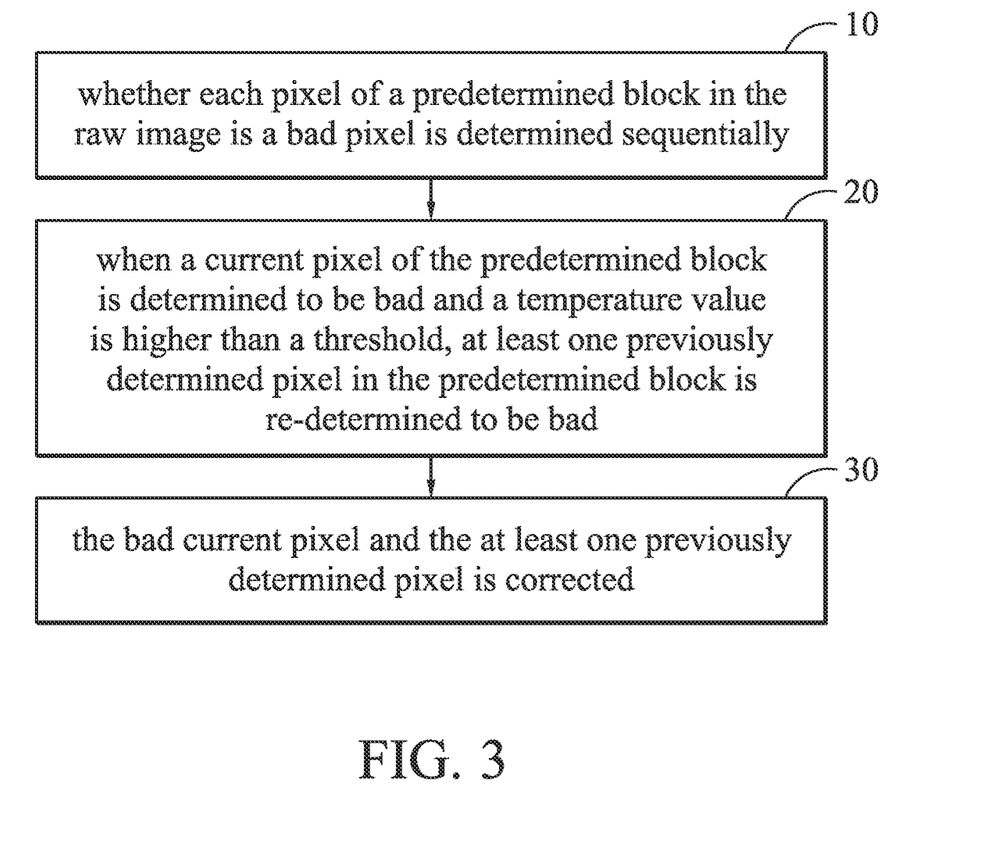
FIG. 3 is a flowchart illustrating the image processing method according to the embodiment of the invention.

FIG. 3 is a flowchart illustrating the image processing method according to the embodiment of the invention. In image processing method for correcting bad pixels according to one embodiment of the invention, whether each pixel of a predetermined block in the raw image is a bad pixel is sequentially determined, in step 10. For example, the bad pixel correction unit 144 determines whether pixels in the predetermined block 146 with a 5×5 pixel array comprising 25 pixels are bad pixels sequentially. In some embodiment, the bad pixel correction unit 144 determines whether five pixels in the first row of the predetermined block 146 are sequentially, and then determines another five pixels in the second row of the predetermined block 146 sequentially, and so on.

Then, in step 20, when a current pixel of the predetermined block is determined to be bad and a temperature value is higher than a threshold, at least one previously determined pixel in the predetermined block is re-determined to be bad, wherein the previously determined pixel is adjacent to the current pixel. For example, the bad pixel correction unit 144 determines whether the temperature value is higher than the threshold according to a detection result from a temperature sensor arranged to senses environment temperature, but it is not limited thereto. In this embodiment, when the bad pixel correction unit 144 determines that the current pixel Nc of the predetermined block 146 is bad and a temperature value is higher than a threshold, such as 50° C., the bad pixel correction unit 144 re-determines that at least one previously pixel is/are bad. In one embodiment, the previously determined pixel(s) can be regarded as the pixel(s) determined and/or corrected prior to the current pixel Nc in the predetermined block 146, but it is not limited thereto. In another embodiment, the prior pixel(s) can be regarded as the pixel(s) determined and/or corrected prior to and adjacent to the current pixel Nc in the predetermined block 146, but it is not limited thereto. For example, when the bad pixel correction unit 144 determines that the current pixel Nc is bad and the temperature value is higher than the threshold, the bad pixel correction unit 144 re-determines that the pixels, such as D8, D9 and D10 (not limited there to), previously determined prior to the current pixel Nc are bad pixels.

Figure 4A:
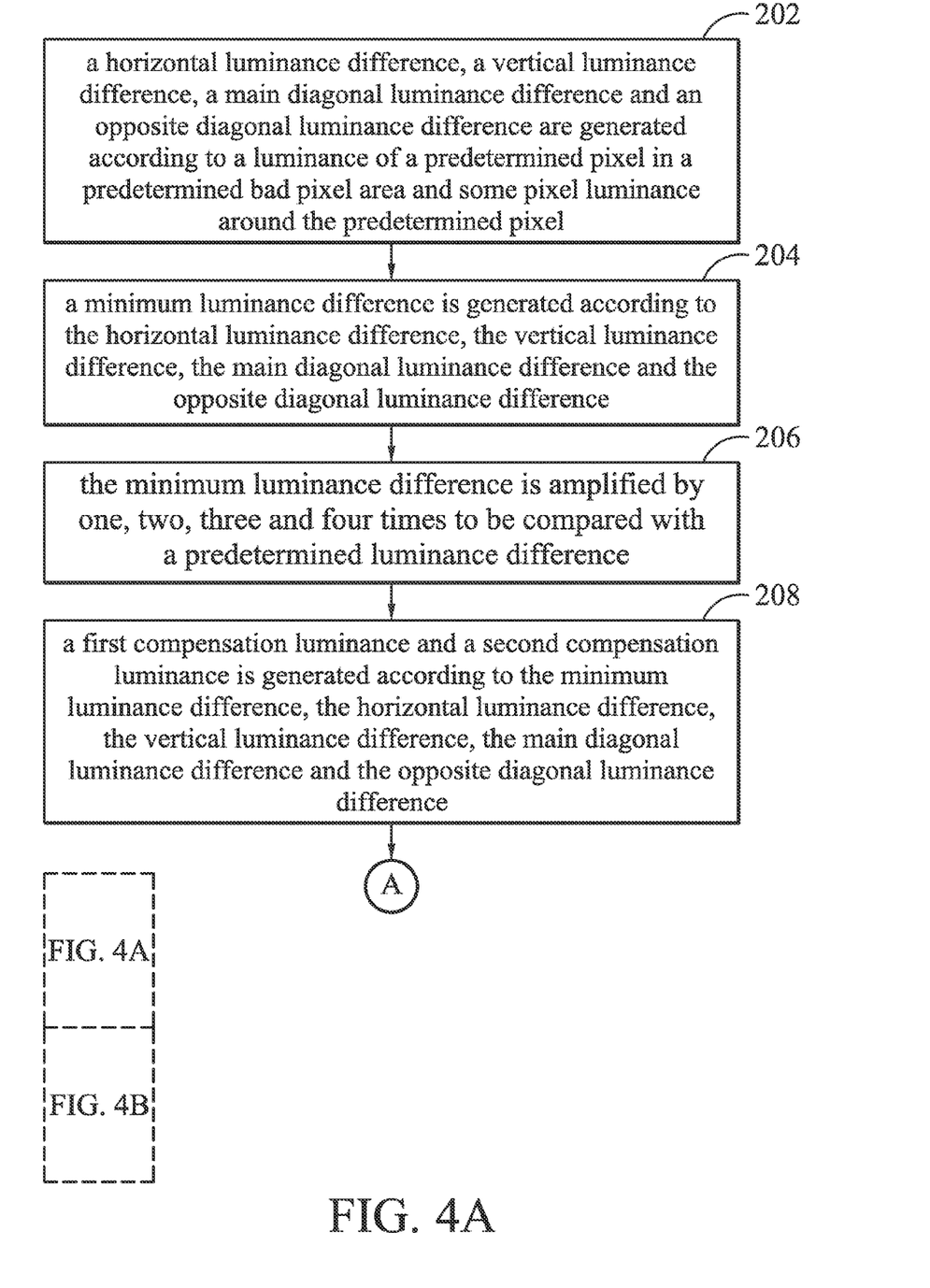
FIGS. 4A and 4B illustrate the image processing method of an embodiment of the invention.
Figure 4B:
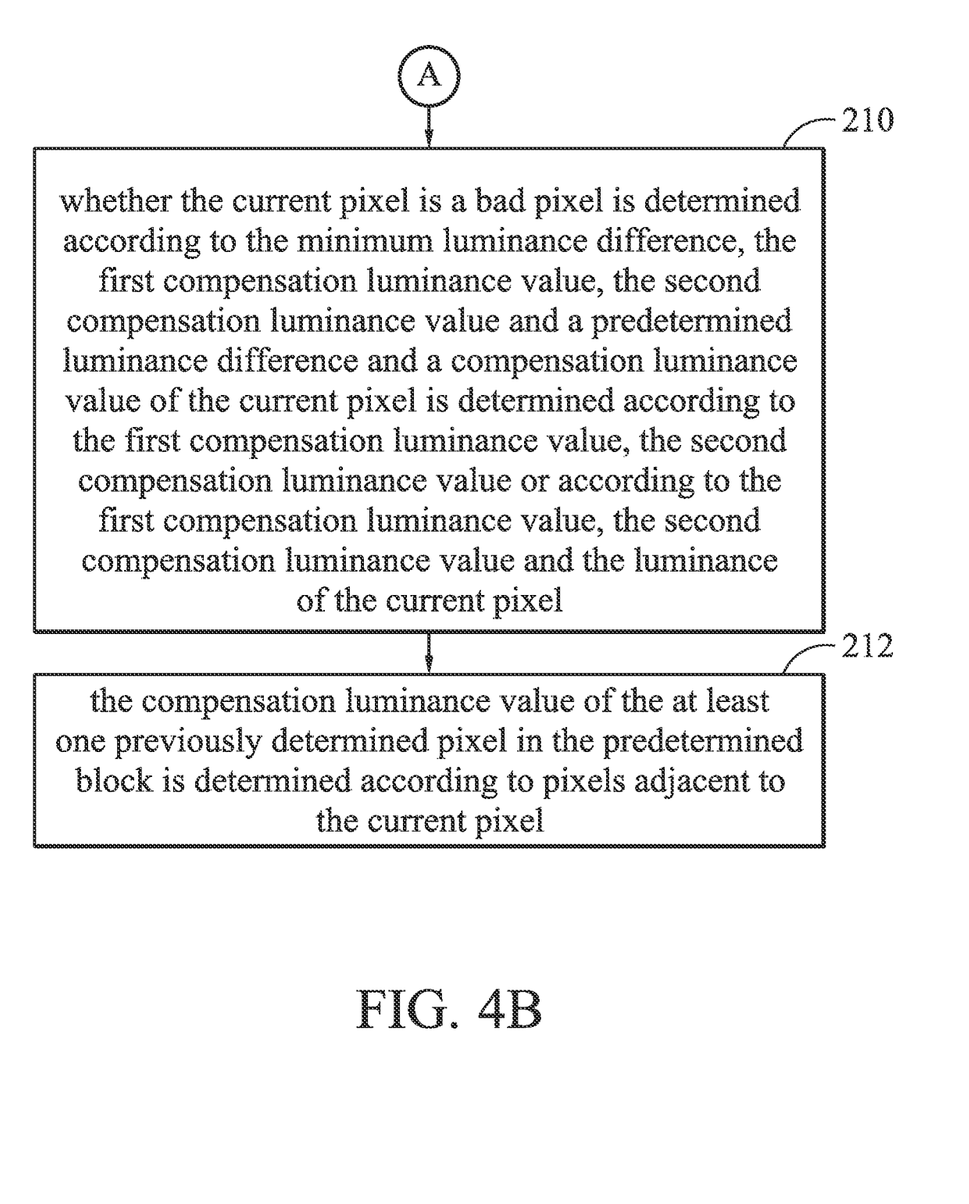

Subsequently, in step 30, the bad current pixel Nc and the at least one previously determined pixel is corrected. In this embodiment, the current pixel and the pixels D8, D9 and D10 are corrected. For example, details for correcting the current pixel Nc will be described in step 210 in FIG. 4, and details for correcting the pixels D8, D9 and D10 will be described in step 212 in FIG. 4, but it would not be limited thereto.

Actually, bad pixels can not be corrected at anytime. For example, when the current pixel to be processed is the pixel D8, the image processing method for correcting bad pixels can not work because there is no enough information. However, when the current pixel to be processed is the pixel NC, the image processing method for correcting bad pixels can be used to correct the pixels D8-D10 if they are bad pixels.

FIGS. 4A and 4B illustrate an image processing method of an embodiment of the invention. In step 202, a horizontal luminance difference, a vertical luminance difference, a main diagonal luminance difference and an opposite diagonal luminance difference corresponding to the current pixel Nc are generated according to a luminance value of the current pixel Nc in a predetermined block 146 and luminance values of some pixels around the current pixel Nc by a first operational unit of the bad pixel correction unit 144.

In detail, the horizontal luminance difference is generated according to the luminance value of the current pixel and luminance value of two pixels adjacent to the current pixel in the same row. Referring to FIG. 2, in the embodiment, for example, the current pixel is pixel Nc and the two pixels adjacent to the current pixel Nc are pixels D3 and D4. The horizontal luminance difference DH may be expressed as the following equation:

$$DH=|2*LNc-(LD3+LD4)|$$

The value LNc is the luminance value of the pixel Nc, and the values LD3 and LD4 respectively are the luminance values of the pixels D3 and D4.

The vertical luminance difference is generated according to the luminance value of the current pixel and luminance values of two pixels adjacent to the current pixel in the same column. Referring to FIG. 2, in the embodiment, for example, the current pixel is pixel Nc and the two pixels adjacent to the current pixel Nc are pixels D1 and D6. The vertical luminance difference DV may be expressed as the following equation:

$$DV=|2*LNc-(LD1+LD6)|$$

The values LD1 and LD6 are the luminance values of the pixels D1 and D6.

The main diagonal luminance difference is generated according to the luminance value of the current pixel and luminance values of two pixels adjacent to the current pixel in the same main diagonal line. Referring to FIG. 2, in the embodiment, for example, the current pixel is pixel Nc and the two pixels adjacent to the current pixel Nc are pixels D0 and D7. The main diagonal luminance difference DNW may be expressed as the following equation:

$$DNW=|2*LNc-(LD0+LD7)|$$

The values LD0 and LD7 are respectively the luminance values of the pixels D0 and D7.

The opposite diagonal luminance difference is generated according to the luminance value of a current pixel and luminance values of two pixels adjacent to the current pixel in the same back diagonal line. Referring to FIG. 2, in the embodiment, for example, the current pixel is pixel Nc and the two pixels adjacent to the current pixel Nc are pixels D2 and D5. The opposite diagonal luminance difference DNE may be expressed as the following equation:

$$DNE=|2*LNc-(LD2+LD5)|$$

The values LD2 and LD5 are respectively the luminance values of the pixels D2 and D5.

In step 204, a minimum luminance difference is generated according to the horizontal luminance difference, the vertical luminance difference, the main diagonal luminance difference and the opposite diagonal luminance difference by a second operational unit of the bad pixel correction unit 144. In the embodiment, the minimum luminance difference Lmin may be expressed as the following formula:

$$L\min=\min(DH,DV,DNE,DNW)$$

In step 206, the minimum luminance difference is amplified by one, two, three and four times to be compared with a predetermined luminance difference by a third operational unit of the bad pixel correction unit 144. In the embodiment, there are four signals (amp1 to amp 4) respectively representing four conditions. The first condition is that the minimum luminance difference is larger than the predetermined luminance difference. The second condition is that the double minimum luminance difference is larger than the predetermined luminance, and so on. The corresponding signal will be logic true when a corresponding condition thereof is met.

In step 208, a first compensation luminance value and a second compensation luminance value is generated according to the minimum luminance difference, the horizontal luminance difference, the vertical luminance difference, the main diagonal luminance difference and the opposite diagonal luminance difference by a fourth operational unit of the bad pixel correction unit 144.

In detail, the first compensation luminance value and the second compensation luminance value are respectively the luminance values of the two pixels adjacent to the current pixel in the same row, when the minimum luminance difference is equal to the horizontal luminance difference. The first compensation luminance value and the second compensation luminance value are respectively the luminance values of the two pixels adjacent to the current pixel in the same column, when the minimum luminance difference is equal to the vertical luminance difference. The first compensation luminance value and the second compensation luminance value are respectively the luminance values of the two pixels adjacent to the current pixel in the same main diagonal line, when the minimum luminance difference is equal to the main diagonal luminance difference. The first compensation luminance value and the second compensation luminance value are respectively the luminance values of the two pixels adjacent to the current pixel in the same back diagonal line, when the minimum luminance difference is equal to the opposite diagonal luminance difference. The step 208 may be expressed as the following formula:

if $(L\min=DH)\{Din0=LD3,Din1=LD4\}$ elseif $(L\min=DV)\{Din0=LD1,Din1=LD6\}$ elseif $(L\min=DNE)\{Din0=LD2,Din1=LD5\}$ else $\{Din0=LD0,Din1=LD7\}$ The terms Din0 and Din1 respectively represent the first compensation luminance value and the second compensation luminance value. The term LDn (n=0 to 7) represents the luminance value of the pixel Dn.

In step 210, by a fifth operational unit of the bad pixel correction unit 144, whether the current pixel is a bad pixel is determined according to the minimum luminance difference, the first compensation luminance value, the second compensation luminance value and a predetermined luminance difference and a compensation luminance value (i.e., the corrected luminance value) of the current pixel is determined according to the first compensation luminance value, the second compensation luminance value or according to the first compensation luminance value, the second compensation luminance value and the luminance of the current pixel.

In detail, the compensation luminance value of the current pixel Nc is equal to a one-second summation of the first compensation luminance value and the second compensation luminance value, when the minimum luminance difference is larger than the predetermined luminance difference and the luminance of the current pixel Nc is larger than the one-second summation of the first compensation luminance value and the second compensation luminance value. The compensation luminance value of the current pixel Nc is equal to a one-third summation of the first compensation luminance value, the second compensation luminance value and the luminance value of the current pixel Nc, when two times the minimum luminance difference is larger than the predetermined luminance difference and the luminance of the current pixel Nc is larger than the one-third summation of the first compensation luminance, the second compensation luminance and the luminance of the current pixel. The compensation luminance value of the current pixel Nc is equal to a one-fourth summation of the first compensation luminance value, the second compensation luminance value and the double luminance of the current pixel Nc, when three times the minimum luminance difference is larger than the predetermined luminance difference and the luminance value of the current pixel Nc is larger than the one-fourth summation of the first compensation luminance value, the second compensation luminance value and the double luminance value of the current pixel Nc. The compensation luminance value of the current pixel Nc is equal to a one-fifth summation of the first compensation luminance value, the second compensation luminance value and the triple luminance of the current pixel Nc, when four times the minimum luminance difference is larger than the predetermined luminance difference and the luminance value of the current pixel Nc is larger than the one-fourth summation of the first compensation luminance value, the second compensation luminance value and the triple luminance value of the current pixel Nc. The step 210 may be expressed as the following formula:

if (amp1 & &($LNc$>($Din0$+$Din1$)/2)){$LNc$=($Din0$+$Din1$)/2,pulse_en=1} elseif (amp2 & &($LNc$>(($Din0$+$Din1$)+$LNc$)/3)){$LNc$=(($Din0$+$Din1$)+$LNc$)/3,pulse_en=1} elseif (amp3 & &($LNc$>(($Din0$+$Din1$)+$LNc$*2)/4)) {$LNc$=(($Din0$+$Din1$)+$LNc$*2)/4,pulse_en=1} elseif (amp4 & &($LNc$>(($Din0$+$Din1$)+$LNc$*3)/5)) {$LNc$=(($Din0$+$Din1$)+$LNc$*3)/5,pulse_en=1} else {$LNc$=$LNc$,pulse_en=0}

The signal (pulse_en) is an enable signal, which represents whether a corresponding condition thereof is met, i.e., the signal pulse_en is 1 when the current pixel is determined as a bad pixel.

In step 212, the compensation luminance value (i.e., the corrected luminance value) of the at least one previously determined pixel in the predetermined block is determined according to pixels adjacent to the current pixel by a sixth operational unit of the bad pixel correction unit 144. In the embodiment, there are three pixels may be compensated for. Namely, there are three pixels are corrected, but it is not limited thereto.

For example, the compensation luminance value of a left upper pixel may be determined according to the luminance values of two red pixels or two blue pixels which are the most adjacent to the left upper pixel in the current pixel Nc, when the left upper pixel is red or blue. The compensation luminance value of the left upper pixel may be determined according to the luminance values of two green pixels which are the most adjacent to the left upper pixel in the current pixel Nc, when the left upper pixel is green.

For example, the compensation luminance value of an upper pixel may be determined according to the luminance values of three red pixels or three blue pixels which are the most adjacent to the upper pixel in the current pixel Nc, when the upper pixel is red or blue. The compensation luminance value of the upper pixel may be determined according to the luminance values of two green pixels which are the most adjacent to the upper pixel in the current pixel Nc, when the upper pixel is green.

For example, the compensation luminance value of a right upper pixel may be determined according to the luminance values of two red pixels or two blue pixels which are the most adjacent to the right upper pixel in the current pixel Nc, when the right upper pixel is red or blue. The compensation luminance value of the right upper pixel may be determined according to the luminance values of two green pixels which are the most adjacent to the right upper pixel in the current pixel Nc, when the right upper pixel is green.

The step 212 may be expressed as the following formula:

if (pulse_en){if ($D8$==blue)or($D8$==red){$LD8$=($LU3$+$LU4$)/2}else ($LD8$=($LD0$+$LD1$)/2}} if (pulse_en){if ($D9$==blue)or($D9$==red){$LD9$=($LD9$+$LU5$+$LU6$+$LR0$)/4}else ($LD9$=($LU1$+$LU2$)/2}} if (pulse_en){if ($D10$==blue)or($D10$==red){$LD10$=($LU3$+$LU4$)/2}else ($LD10$=($LD1$+$LD2$)/2}}

Figure 5:
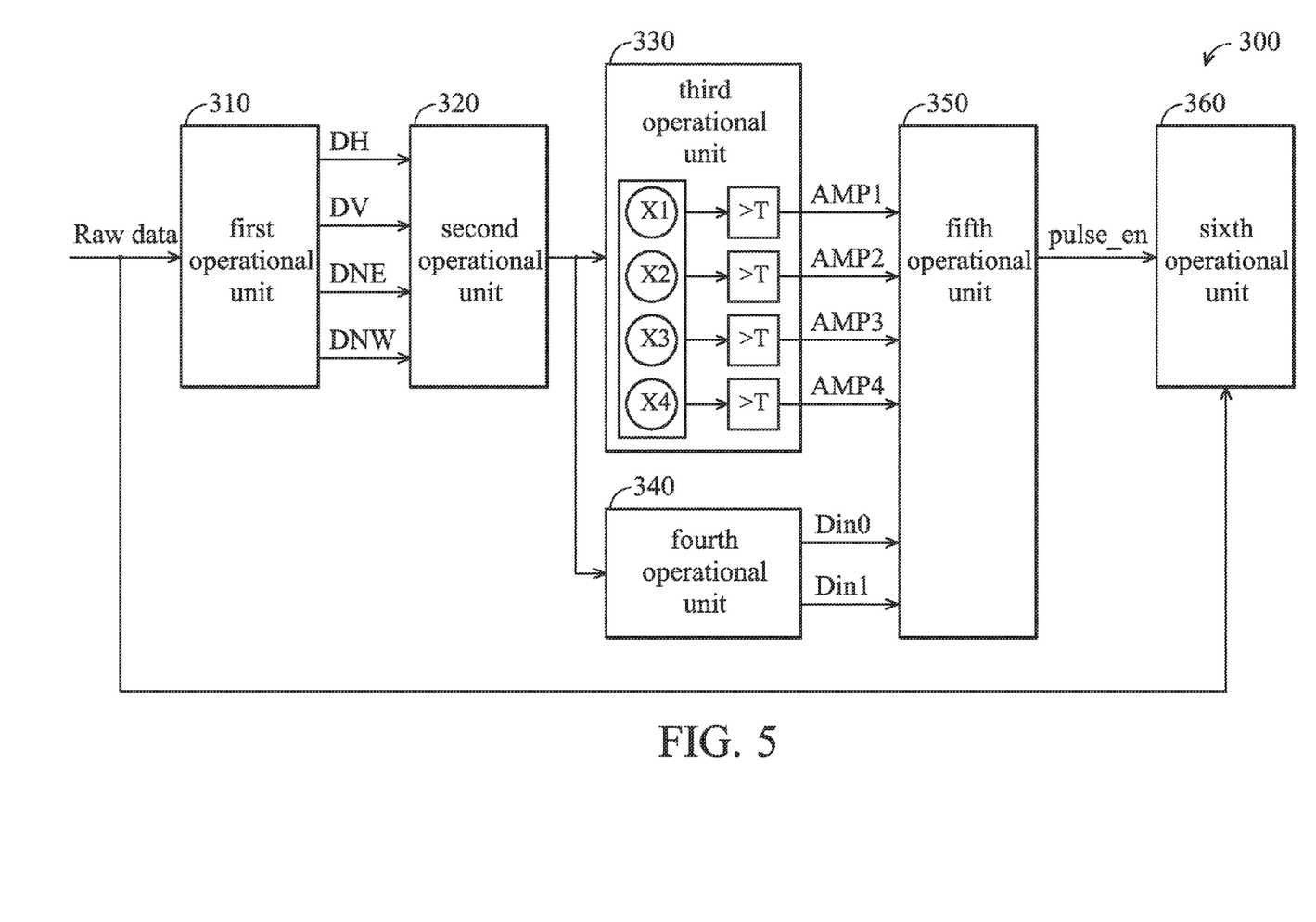
FIG. 5 is a diagram showing an image processing device according to the embodiment of the invention.

FIG. 5 is a diagram showing an image processing device according to the embodiment of the invention. The image processing device includes a bad pixel correction unit 300. The bad pixel correction unit 300 includes a first operational unit 310, a second operational unit 320, a third operational unit 330, a fourth operational unit 340, a fifth operational unit 350 and a sixth operational unit 360.

The first operational unit 310 is used for generating a horizontal luminance difference, a vertical luminance difference, a main diagonal luminance difference and an opposite diagonal luminance difference according to a luminance of a current pixel in a current bad pixel area and some pixel luminance around the current pixel.

In detail, the horizontal luminance difference is generated according to the luminance value of the current pixel and luminance values of two pixels adjacent to the current pixel in the same row. Referring to FIG. 2, in the embodiment, for example, the current pixel is pixel Nc and the two pixels adjacent to the current pixel Nc are pixels D3 and D4. The horizontal luminance difference DH may be expressed as the following equation:

$DH=|2*LNc-(LD3+LD4)|$

The value LNc is the luminance value of the pixel Nc, and the values LD3 and LD4 are the luminance values of the pixels D3 and D4.

The vertical luminance difference is generated according to the luminance value of the current pixel and luminance values of two pixels adjacent to the current pixel in the same column. Referring to FIG. 2, in the embodiment, for example, the current pixel is pixel Nc and the two pixels adjacent to the current pixel Nc are pixels D1 and D6. The vertical luminance difference DV may be expressed as the following equation:

$$DV=|2*LNc-(LD1+LD6)|$$

The values LD1 and LD6 are the luminance values of the pixels D1 and D6.

The main diagonal luminance difference is generated according to the luminance value of the current pixel and luminance values of two pixels adjacent to the current pixel in the same main diagonal line. Referring to FIG. 2, in the embodiment, for example, the current pixel is pixel Nc and the two pixels adjacent to the current pixel Nc are pixels D0 and D7. The main diagonal luminance difference DNW may be expressed as the following equation:

$$DNW=|2*LNc-(LD0+LD7)|$$

The values LD0 and LD7 are the luminance values of the pixels D0 and D7.

The opposite diagonal luminance difference is generated according to the luminance value of a current pixel and luminance values of two pixels adjacent to the current pixel in the same back diagonal line. Referring to FIG. 2, in the embodiment, for example, the current pixel is pixel Nc and the two pixels adjacent to the current pixel Nc are pixels D2 and D5. The opposite diagonal luminance difference DNE may be expressed as the following equation:

$$DNE=|2*LNc-(LD2+LD5)|$$

The values LD2 and LD5 are the luminance values of the pixels D2 and D5.

The second operational unit 320 is used for generating a minimum luminance difference according to the horizontal luminance difference DH, the vertical luminance difference DV, the main diagonal luminance difference DNW and the opposite diagonal luminance difference DNE. In the embodiment, the minimum luminance difference may be expressed as the following formula:

$$L\min=\min(DH,DV,DNE,DNW)$$

The term Lmin represents the minimum luminance difference.

The third operational unit 330 is used for amplifying the minimum luminance difference by one, two, three and four times to be compared with a predetermined luminance difference. In the embodiment, there are four signals (amp1 to amp 4) respectively representing four conditions. The first condition is that the minimum luminance difference Lmin is larger than the predetermined luminance difference. The second condition is that the double minimum luminance difference is larger than the predetermined luminance, and so on. The corresponding signal will be logic true when a corresponding condition thereof is met.

The fourth operational unit 340 is used for generating a first compensation luminance value and a second compensation luminance value according to the minimum luminance difference Lmin, the horizontal luminance difference DH, the vertical luminance difference DV, the main diagonal luminance difference DNW and the opposite diagonal luminance difference DNE.

In detail, the first compensation luminance value and the second compensation luminance value are respectively the luminance value of the two pixels adjacent to the current pixel Nc in the same row, when the minimum luminance difference Lmin is equal to the horizontal luminance difference DH. The first compensation luminance value and the second compensation luminance value are respectively the luminance values of the two pixels adjacent to the current pixel Nc in the same column, when the minimum luminance difference Lmin is equal to the vertical luminance difference DV. The first compensation luminance value and the second compensation luminance value are respectively the luminance values of the two pixels adjacent to the current pixel in the same main diagonal line, when the minimum luminance difference Lmin is equal to the main diagonal luminance difference DNW. The first compensation luminance value and the second compensation luminance value are respectively the luminance values of the two pixels adjacent to the current pixel Nc in the same back diagonal line when the minimum luminance difference Lmin is equal to the opposite diagonal luminance difference DNE. The fourth operational unit 340 may be expressed as the following formula:

if $(L\min=DH)\{Din0=LD3,Din1=LD4\}$ elseif $(L\min=DV)\{Din0=LD1,Din1=LD6\}$ elseif $(L\min=DNE)\{Din0=LD2,Din1=LD5\}$ else $\{Din0=LD0,Din1=LD7\}$ The terms Din0 and Din1 are the first compensation luminance value and the second compensation luminance value. The term LDn (n=0 to 7) represents the luminance of the pixel Dn.

The fifth operational unit 350 is used for whether the current pixel is a bad pixel is determined according to the minimum luminance difference, the first compensation luminance value, the second compensation luminance value and a predetermined luminance difference and determining a compensation value (i.e., the corrected luminance value) of the current pixel according to the first compensation luminance value, the second compensation luminance value or according to the first compensation luminance value, the second compensation luminance value and the luminance value of the current pixel. The compensation value of the current pixel is the corrected luminance value of which.

In detail, the compensation luminance of the current pixel Nc is equal to a one-second summation of the first compensation luminance value and the second compensation luminance value, when the minimum luminance difference is larger than the predetermined luminance difference and the luminance value LNc of the current pixel Nc is larger than the one-second summation of the first compensation luminance value and the second compensation luminance value. The compensation luminance value LNc of the current pixel Nc is equal to a one-third summation of the first compensation luminance value, the second compensation luminance value and the luminance value of the current pixel Nc, when two times the minimum luminance difference is larger than the predetermined luminance difference and the luminance value LNc of the current pixel Nc is larger than the one-third summation of the first compensation luminance value, the second compensation luminance value and the luminance value LNc of the current pixel Nc. The compensation luminance value LNc of the current pixel Nc is equal to a one-fourth summation of the first compensation luminance value, the second compensation luminance value and the double luminance of the current pixel Nc, when three times the minimum luminance difference is larger than the predetermined luminance difference and the luminance value LNc of the current pixel Nc is larger than the one-fourth summation of the first compensation luminance value, the second compensation luminance value and the double luminance of the current pixel Nc. The compensation luminance value LNc of the current pixel Nc is equal to a one-fifth summation of the first compensation luminance value, the second compensation luminance value and the triple luminance of the current pixel Nc, when four times the minimum luminance difference is larger than the predetermined luminance difference and the luminance value of the current pixel Nc is larger than the one-fourth summation of the first compensation luminance value, the second compensation luminance value and the triple luminance of the current pixel Nc. The fifth operational unit 210 may be expressed as the following formula:

if (amp1 && ($LNc$>($Din0$+$Din1$)/2)){$LNc$=($Din0$+$Din1$)/2,pulse_en=1} elseif (amp2 && ($LNc$>(($Din0$+$Din1$)+$LNc$)/3)) {$LNc$=(($Din0$+$Din1$)+$LNc$)/3,pulse_en=1} elseif (amp3 && ($LNc$>(($Din0$+$Din1$)+$LNc$*2)/4)) {$LNc$=(($Din0$+$Din1$)+$LNc$*2)/4,pulse_en=1} elseif (amp4 && ($LNc$>(($Din0$+$Din1$)+$LNc$*3)/5)) {$LNc$=(($Din0$+$Din1$)+$LNc$*3)/5,pulse_en=1} else {$LNc$=$LNc$,pulse_en=0}

The signal (pulse_en) is an enable signal, which represents whether a corresponding condition thereof is met, i.e., the signal pulse_en is 1 when the current pixel is determined as a bad pixel.

A sixth operational unit 360 is used for determining compensation luminance values (i.e., the corrected luminance values) of other pixels (i.e., the previously determined pixels) in the predetermined block 146 according to pixels of the image adjacent to the current pixel Nc. In the embodiment, there are three pixels else may be corrected. In this embodiment, pixels D8, D9 and D10 are previously determined pixels and may be corrected, but it is not limited thereto.

For example, the compensation luminance value of a left upper pixel D8 may be determined according to the luminance values of two red pixels or two blue pixels (such as pixels U3 and U4) which are the most adjacent to the left upper pixel D8 in the image, when the left upper pixel D8 is red or blue. The compensation luminance value of the left upper pixel D8 may be determined according to the luminance values of two green pixels (such as pixels D0 and D0 which are the most adjacent to the left upper pixel D8 in the image when the left upper pixel D8 is green.

For example, the compensation luminance value of an upper pixel D9 may be determined according to the luminance values of at least three red pixels or at least three blue pixels (such as pixels D9, U5, U6 and R0) which are the most adjacent to the upper pixel D9 in the image, when the upper pixel D9 is red or blue. The compensation luminance value of the upper pixel D9 may be determined according to the luminance values of two green pixels (such as pixels U1 and U2) which are the most adjacent to the upper pixel D9 in the image, when the upper pixel D9 is green.

For example, the compensation luminance value of a right upper pixel D10 may be determined according to the luminance values of two red pixels or two blue pixels (such as pixels U3 and U4) which are the most adjacent to the right upper pixel D10 in the image, when the right upper pixel D10 is red or blue. The compensation luminance value of the right upper pixel D10 may be determined according to the luminance values of two green pixels (such as pixels D1 and D2) which are the most adjacent to the right upper pixel D10 in the image, when the right upper pixel D10 is green. In this embodiment, the compensation luminance values of pixels D8, D9 and D10 are the corrected luminance values of which. The sixth operation unit 360 may be expressed as the following formula:

if (pulse_en){if ($D8$==blue)or($D8$==red){$LD8$=($LU3$+$LU4$)/2}else ($LD8$=($LD0$+$LD1$)/2}} if (pulse_en){if ($D9$==blue)or($D9$==red){$LD9$=($LD9$+$LU5$+$LU6$+$LR0$)/4}else ($LD9$=($LU1$+$LU2$)/2}} if (pulse_en){if ($D10$==blue)or($D10$==red){$LD10$=($LU3$+$LU4$)/2}else ($LD10$=($LD1$+$LD2$)/2}}

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A bad pixel correction method for an image, comprising:
   determining whether each of pixels of a predetermined block in the image is a bad pixel sequentially;
   when a current pixel of the block is determined to be bad and a temperature value is higher than a threshold, re-determining that at least one previously determined pixel in the predetermined block to be bad, wherein the previously determined pixel is adjacent to the current pixel; and
   correcting the current pixel and the previously determined pixel;
   wherein the step of determining whether each of the pixels of the predetermined block comprises:
   generating a horizontal luminance difference, a vertical luminance difference, a main diagonal luminance difference and an opposite diagonal luminance difference according to a luminance value of the current pixel and luminance values of pixels around the current pixel in the predetermined block;
   generating a minimum luminance difference according to the horizontal luminance difference, the vertical luminance difference, the main diagonal luminance difference and the opposite diagonal luminance difference;
   generating a first compensation luminance value and a second compensation luminance value according to the minimum luminance difference, the horizontal luminance difference, the vertical luminance difference, the main diagonal luminance difference and the opposite diagonal luminance difference; and
   determining whether the current pixel is a bad pixel according to the minimum luminance difference and a predetermined luminance difference;
   wherein the correcting step comprises:
   determining a compensation luminance value of the current pixel according to the first compensation luminance value, the second compensation luminance value or according to the first compensation luminance value, the second compensation luminance value and the luminance value of the current pixel; and
   determining a compensation luminance value of the at least one previously determined pixel in the block;
   wherein the step of determining whether each of the pixels of the predetermined block further comprises:
   amplifying the minimum luminance difference by one, two, three and four; and comparing the minimum luminance difference, two times the minimum luminance difference, three times the minimum luminance difference and four times the minimum luminance difference with the predetermined luminance difference, respectively, wherein the step of determining whether the current pixel is a bad pixel according to the minimum luminance difference and the predetermined luminance difference comprises:

determining that the current pixel is a bad pixel, if the minimum luminance difference is larger than the predetermined luminance difference and the luminance value of the current pixel is larger than a one-second summation of the first compensation luminance value and the second compensation luminance value;

determining that the current pixel is a bad pixel, if two times the minimum luminance difference is larger than the predetermined luminance difference and the luminance value of the current pixel is larger than a one-third summation of the first compensation luminance value, the second compensation luminance value and the luminance value of the current pixel;

determining that the current pixel is a bad pixel, if three times the minimum luminance difference is larger than the predetermined luminance difference and the luminance value of the current pixel is larger than a one-fourth summation of the first compensation luminance value, the second compensation luminance value and a double luminance value of the current pixel;

determining that the current pixel is a bad pixel, if four times the minimum luminance difference is larger than the predetermined luminance difference and the luminance value of the current pixel is larger than a one-fifth summation of the first compensation luminance value, the second compensation luminance value and a triple luminance value of the current pixel; and determining that the current pixel is not a bad pixel, else.

2. The image processing method as claimed in claim 1, wherein generating the horizontal luminance difference, the vertical luminance difference, the main diagonal luminance difference and the opposite diagonal luminance difference comprises:

generating the horizontal luminance difference according to the luminance value of the current pixel and luminance values of two pixels adjacent to the current pixel in the same row;

generating the vertical luminance difference according to the luminance value of the current pixel and luminance values of two pixels adjacent to the current pixel in the same column;

generating the main diagonal luminance difference according to the luminance of the current pixel and luminance values of two pixels adjacent to the current pixel in the same main diagonal line; and generating the opposite diagonal luminance difference according to the luminance value of a current pixel and luminance values of two pixels adjacent to the current pixel in the same back diagonal line.

3. The image processing method as claimed in claim 2, wherein generating the first compensation luminance value and the second compensation luminance value comprises:

the first compensation luminance value and the second compensation luminance value respectively being the luminance values of the two pixels adjacent to the current pixel in the same row when the minimum luminance difference is equal to the horizontal luminance difference;

the first compensation luminance value and the second compensation luminance value respectively being the luminance values of the two pixels adjacent to the current pixel in the same column when the minimum luminance difference is equal to the vertical luminance difference;

the first compensation luminance value and the second compensation luminance value respectively being the luminance values of the two pixels adjacent to the current pixel in the same main diagonal line when the minimum luminance difference is equal to the main diagonal luminance difference; and the first compensation luminance value and the second compensation luminance value respectively being the luminance values of the two pixels adjacent to the current pixel in the same back diagonal line when the minimum luminance difference is equal to the opposite diagonal luminance difference.

4. The image processing method as claimed in claim 3, wherein determining the compensation luminance value of the current pixel comprises:

the compensation luminance value of the current pixel being equal to a one-second summation of the first compensation luminance value and the second compensation luminance value, when the minimum luminance difference is larger than the predetermined luminance difference and the luminance value of the current pixel is larger than the one-second summation of the first compensation luminance value and the second compensation luminance value;

the compensation luminance value of the current pixel being equal to a one-third summation of the first compensation luminance value, the second compensation luminance value and the luminance value of the current pixel when two times the minimum luminance difference is larger than the predetermined luminance difference and the luminance value of the current pixel is larger than the one-third summation of the first compensation luminance value, the second compensation luminance value and the luminance value of the current pixel;

the compensation luminance value of the current pixel being equal to a one-fourth summation of the first compensation luminance value, the second compensation luminance value and the double luminance value of the current pixel, when three times the minimum luminance difference is larger than the predetermined luminance difference and the luminance value of the current pixel is larger than the one-fourth summation of the first compensation luminance value, the second compensation luminance value and the double luminance value of the current pixel; and the compensation luminance value of the current pixel being equal to a one-fifth summation of the first compensation luminance value, the second compensation luminance value and the triple luminance value of the current pixel, when four times the minimum luminance difference is larger than the predetermined luminance difference and the luminance value of the current pixel is larger than the one-fourth summation of the first compensation luminance value, the second compensation luminance value and the triple luminance value of the current pixel.

5. The image processing method as claimed in claim 4, wherein determining the compensation luminance value(s) of the previously determined pixel(s) comprises:

determining a compensation luminance value of a left upper pixel according to the luminance values of two red pixels or two blue pixels which are the most adjacent to the left upper pixel in the predetermined block, when the left upper pixel is red or blue; and determining a compensation luminance value of a left upper pixel according to the luminance values of two green pixels which are the most adjacent to the left upper pixel in the predetermined block, when the left upper pixel is green.

6. The image processing method as claimed in claim 5, wherein determining the compensation value(s) of the previously determined pixel(s) comprises:

determining a compensation luminance value of an upper pixel according to the luminance values of three red pixels or three blue pixels which are the most adjacent to the upper pixel in the predetermined block, when the upper pixel is red or blue; and determining a compensation luminance value of an upper pixel according to the luminance values of two green pixels which are the most adjacent to the upper pixel in the predetermined block, when the upper pixel is green.

7. The image processing method as claimed in claim 6, wherein determining the compensation luminance value(s) of the previously determined pixel(s) comprises:

determining a compensation luminance value of a right upper pixel according to the luminance values of two red pixels or two blue pixels which are the most adjacent to the right upper pixel in the predetermined block, when the right upper pixel is red or blue; and determining a compensation luminance value of a right upper pixel according to the luminance values of two green pixels which are the most adjacent to the right upper pixel in the predetermined block, when the right upper pixel is green.

8. An image sensor, comprising:

a pixel array; and an image processor, comprising a bad pixel correction unit, wherein the bad pixel correction unit is arranged to determine whether each of pixels of a predetermined block in an image from the pixel array is a bad pixel sequentially, re-determine that at least one previously determined pixel in the predetermined block is bad, when a current pixel of the block is determined to be bad and a temperature value is higher than a threshold, and correct the current pixel and the previously determined pixel, wherein the previously determined pixel is adjacent to the current pixel, wherein the bad pixel correction unit comprises:

a first operational unit for generating a horizontal luminance difference, a vertical luminance difference, a main diagonal luminance difference and an opposite diagonal luminance difference according to a luminance value of the current pixel and luminance values of pixels around the current pixel in the predetermined block;

a second operational unit for generating a minimum luminance difference according to the horizontal luminance difference, the vertical luminance difference, the main diagonal luminance difference and the opposite diagonal luminance difference; and a third operational unit for amplifying the minimum luminance difference by one, two, three and four, and comparing the minimum luminance difference, two times the minimum luminance difference, three times the minimum luminance difference and four times the minimum luminance difference with the predetermined luminance difference, respectively;

wherein the correcting step comprises:

a fourth operational unit for generating a first compensation luminance value and a second compensation luminance value according to the minimum luminance difference, the horizontal luminance difference, the vertical luminance difference, the main diagonal luminance difference and the opposite diagonal luminance difference;

a fifth operational unit for determining whether the current pixel is a bad pixel according to the minimum luminance difference, the first compensation luminance value, the second compensation luminance value and a predetermined luminance difference and determining a compensation value of the current pixel according to the first compensation luminance value, the second compensation luminance value or according to the first compensation luminance value, the second compensation luminance value and the luminance value of the current pixel; and a sixth operational unit for determining a compensation luminance value of the at least one previously determined pixel in the block;

wherein the fifth operational unit determines that the current pixel is a bad pixel, if the minimum luminance difference is larger than the predetermined luminance difference and the luminance value of the current pixel is larger than a one-second summation of the first compensation luminance value and the second compensation luminance value;

the fifth operational unit determines that the current pixel is a bad pixel, if two times the minimum luminance difference is larger than the predetermined luminance difference and the luminance value of the current pixel is larger than a one-third summation of the first compensation luminance value, the second compensation luminance value and the luminance value of the current pixel;

the fifth operational unit determines that the current pixel is a bad pixel, if three times the minimum luminance difference is larger than the predetermined luminance difference and the luminance value of the current pixel is larger than a one-fourth summation of the first compensation luminance value, the second compensation luminance value and a double luminance value of the current pixel;

the fifth operational unit determines that the current pixel is a bad pixel, if four times the minimum luminance difference is larger than the predetermined luminance difference and the luminance value of the current pixel is larger than a one-fifth summation of the first compensation luminance value, the second compensation luminance value and a triple luminance value of the current pixel; and the fifth operational unit determines that the current pixel is not a bad pixel, else.

9. The image sensor as claimed in claim 8, wherein the first operational unit generates the horizontal luminance difference according to the luminance value of the current pixel and luminance values of two pixels adjacent to the current pixel in the same row; the first operational unit generates the vertical luminance difference according to the luminance value of the current pixel and luminance values of two pixels adjacent to the current pixel in the same column; the first operational unit generates the main diagonal luminance difference according to the luminance value of the current pixel and luminance values of two pixels adjacent to the current pixel in the same main diagonal line; and the first operational unit generates the opposite diagonal luminance difference according to the luminance value of a current pixel and luminance values of two pixels adjacent to the current pixel in the same back diagonal line.

10. The image sensor as claimed in claim 9, wherein the fourth operational unit generates the first compensation luminance and the second compensation luminance according to following steps of:

the first compensation luminance value and the second compensation luminance value respectively being the luminance values of the two pixels adjacent to the current pixel in the same row, when the minimum luminance difference is equal to the horizontal luminance difference;

the first compensation luminance value and the second compensation luminance value respectively being the luminance values of the two pixels adjacent to the current pixel in the same column, when the minimum luminance difference is equal to the vertical luminance difference;

the first compensation luminance value and the second compensation luminance value respectively being the luminance values of the two pixels adjacent to the current pixel in the same main diagonal line, when the minimum luminance difference is equal to the main diagonal luminance difference; and the first compensation luminance value and the second compensation luminance value respectively being the luminance values of the two pixels adjacent to the current pixel in the same back diagonal line, when the minimum luminance difference is equal to the opposite diagonal luminance difference.

11. The image sensor as claimed in claim 10, wherein the fifth operational unit generates the compensation of the current pixel according to following steps of:

the compensation luminance value of the current pixel being equal to a one-second summation of the first compensation luminance and the second compensation luminance, when the minimum luminance difference is larger than the predetermined luminance difference and the luminance value of the current pixel is larger than the one-second summation of the first compensation luminance value and the second compensation luminance value;

the compensation luminance value of the current pixel being equal to a one-third summation of the first compensation luminance value, the second compensation luminance value and the luminance values of the current pixel, when two times the minimum luminance difference is larger than the predetermined luminance difference and the luminance value of the current pixel is larger than the one-third summation of the first compensation luminance value, the second compensation luminance value and the luminance value of the current pixel;

the compensation luminance value of the current pixel being equal to a one-fourth summation of the first compensation luminance value, the second compensation luminance value and the double luminance value of the current pixel, when three times the minimum luminance difference is larger than the predetermined luminance difference and the luminance value of the current pixel is larger than the one-fourth summation of the first compensation luminance value, the second compensation luminance value and the double luminance value of the current pixel; and the compensation luminance value of the current pixel is equal to a one-fifth summation of the first compensation luminance value, the second compensation luminance value and the triple luminance value of the current pixel, when four times the minimum luminance difference is larger than the predetermined luminance difference and the luminance value of the current pixel is larger than the one-fourth summation of the first compensation luminance value, the second compensation luminance value and the triple luminance value of the current pixel.

12. The image sensor as claimed in claim 11, wherein the sixth operational unit generates the compensation value(s) of the previously determined pixels according to following steps of:

determining a compensation luminance value of a left upper pixel according to the luminance values of two red pixels or two blue pixels which are the most adjacent to the left upper pixel in the predetermined, when the left upper pixel is red or blue; and determining a compensation luminance value of a left upper pixel according to the luminance values of two green pixels which are the most adjacent to the left upper pixel in the predetermined block, when the left upper pixel is green.

13. The image sensor as claimed in claim 12, wherein the sixth operational unit generates the compensation value(s) of the previously determined pixels according to following steps of:

determining a compensation luminance value of an upper pixel according to the luminance values of three red pixels or three blue pixels which are the most adjacent to the upper pixel in the predetermined block, when the upper pixel is red or blue; and determining a compensation luminance value of an upper pixel according to the luminance values of two green pixels which are the most adjacent to the upper pixel in the predetermined block, when the upper pixel is green.

14. The image sensor as claimed in claim 13, wherein the sixth operational unit generates the compensation value(s) of the previously determined pixels according to following steps of:

determining a compensation luminance value of a right upper pixel according to the luminance values of two red pixels or two blue pixels which are the most adjacent to the right upper pixel in the predetermined block, when the right upper pixel is red or blue; and determining a compensation luminance value of a right upper pixel according to the luminance values of two green pixels which are the most adjacent to the right upper pixel in the predetermined block, when the right upper pixel is green.

* * * * *